United States Patent
Jousma

(10) Patent No.: US 9,771,075 B2
(45) Date of Patent: Sep. 26, 2017

(54) SUB-IDLE DOWNSHIFT CONTROL OF A TRANSMISSION

(71) Applicant: GM GLOBAL TECHNOLOGY OPERATIONS LLC, Detroit, MI (US)

(72) Inventor: Jason Jousma, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 228 days.

(21) Appl. No.: 14/449,220

(22) Filed: Aug. 1, 2014

(65) Prior Publication Data

US 2016/0031445 A1 Feb. 4, 2016

(51) Int. Cl.
| | |
|---|---|
| B60W 30/18 | (2012.01) |
| F16H 1/04 | (2006.01) |
| B60W 10/02 | (2006.01) |
| B60W 10/06 | (2006.01) |
| B60W 30/188 | (2012.01) |
| B60W 10/10 | (2012.01) |
| F16H 61/04 | (2006.01) |

(52) U.S. Cl.
CPC .... B60W 30/18009 (2013.01); B60W 10/023 (2013.01); B60W 10/06 (2013.01); B60W 10/10 (2013.01); B60W 30/188 (2013.01); F16H 61/04 (2013.01)

(58) Field of Classification Search
None
See application file for complete search history.

(56) References Cited

U.S. PATENT DOCUMENTS

| | | | | |
|---|---|---|---|---|
| 4,964,318 | A * | 10/1990 | Ganoung | B60W 30/18 123/478 |
| 6,319,170 | B1 * | 11/2001 | Hubbard | B60W 30/1819 477/107 |
| 2002/0055412 | A1 | 5/2002 | Suzuki | |
| 2003/0027685 | A1 | 2/2003 | Watanabe et al. | |
| 2006/0142117 | A1 * | 6/2006 | Colvin | B60K 6/365 477/107 |

FOREIGN PATENT DOCUMENTS

| | | |
|---|---|---|
| CN | 1938535 A | 3/2007 |
| CN | 102287530 A | 12/2011 |
| JP | H0331536 A | 2/1991 |

* cited by examiner

*Primary Examiner* — Colby M Hansen
(74) *Attorney, Agent, or Firm* — Quinn IP Law

(57) ABSTRACT

A method is provided for use in a vehicle. The vehicle includes a transmission, a turbocharger, a transmission control module (TCM), an engine, and an engine control module (ECM). The engine includes a crankshaft that rotates at an engine speed and the turbocharger includes a turbine that rotates at a turbine speed. The method includes requesting a downshift of the transmission from an off-going gear ratio to an on-coming gear ratio. The turbine is rotating at an off-going turbine speed at the off-going gear ratio and the turbine is configured to rotate at an on-coming turbine speed at the on-coming gear ratio, greater than the off-going gear speed. A determination is made that the requested downshift is a powerdown low-throttle shift. An engine speed request value is then transmitted from the TCM to the ECM. The transmitted engine speed request value is at least equal to the on-coming gear speed.

8 Claims, 3 Drawing Sheets

SUB-IDLE DOWNSHIFT CONTROL OF A TRANSMISSION

TECHNICAL FIELD

The present disclosure relates to sub-idle downshift control of a transmission.

BACKGROUND

Vehicles may include a fluid coupling, e.g., a torque converter, which interconnects an output from an engine with an input into a transmission. The vehicle may further include a torque converter clutch that mechanically connects a turbine of the torque converter to a pump of the torque converter. When the rotational speed of the engine is relatively constant and approximately equal to the rotational speed of the turbine, the torque converter clutch may be positioned in a locked operating state to mechanically connect the output of the engine and the input of the transmission to reduce energy losses through the torque converter. At other times, such as during acceleration or braking, the torque converter clutch may be positioned in an unlocked operating state to disconnect the mechanical connection between the output of the engine and the input of the transmission and allow relative slippage between the turbine and the pump of the torque converter.

When the torque converter clutch is in the unlocked operating state, the transmission is not actively controlling the rotational speed of the engine. It is desirable to have the rotational speed of the engine less than the rotational speed of the turbine to ensure that there is enough negative acceleration when the vehicle is coasting to reduce a sail-on effect, and to prevent acceleration during fast braking, which may occur if the rotational speed of the turbine falls below the rotational speed of the engine. During coastdown, the torque output of the engine is controlled to regulate the rotational speed of the engine so that the rotational speed of the engine does not greatly differ from a rotational speed of the turbine of the torque converter. Typically, a control module will adjust certain operating parameters, such as the timing and/or throttle position, to regulate the torque output of the engine to control the rotational speed of the engine. The control module references a table that defines desired values for the certain operating parameters given the specific operating conditions of the vehicle. The control module then adjusts the various operating parameters to achieve the desired engine speed. In so doing, the rotational engine speed may be as much as 200 to 400 rpm below the rotational speed of the turbine to ensure that the rotational speed of the engine is not greater than the rotational speed of the turbine. However, this high lash, i.e., the 200 to 400 rpm difference between the rotational speed of the engine and the rotational speed of the turbine, may cause a clunk or other undesirable noise.

SUMMARY

A method for use in a vehicle is disclosed herein. The vehicle includes a transmission, a turbocharger, a transmission control module (TCM), an engine, and an engine control module (ECM). The engine includes a crankshaft that rotates at an engine speed and the turbocharger includes a turbine that rotates at a turbine speed. The method includes requesting a downshift of the transmission from an off-going gear ratio to an on-coming gear ratio. The turbine is rotating at an off-going turbine speed at the off-going gear ratio. The turbine is configured to rotate at an on-coming turbine speed at the on-coming gear ratio that is greater than the off-going turbine speed A determination is made that the requested downshift is a powerdown low-throttle shift (PDLT). An engine speed request value is then transmitted from the TCM to the ECM. The transmitted engine speed request value is at least equal to the on-coming gear speed.

A vehicle is provided in another aspect of the disclosure. The vehicle includes an engine, a torque converter, a transmission, and a controller. The engine includes a crankshaft configured to rotate at an engine speed. The torque converter is operatively connected to the engine. The torque converter includes a turbine configured to rotate at a turbine speed. The transmission is operatively connected to the turbocharger. The transmission includes an off-going gear ratio and an on-coming gear ratio. The controller includes a transmission control module (TCM) and an engine control module (ECM).

An algorithm is stored on, and executed by, the TCM and the ECM. The algorithm causes the controller to request a downshift of the transmission from an off-going gear ratio to an on-coming gear ratio. The turbine rotates at an off-going turbine speed at the off-going gear ratio and the turbine is configured to rotate at an on-coming turbine speed at the on-coming gear ratio that is greater than the off-going turbine speed.

The requested downshift is a powerdown low-throttle (PDLT) shift. An engine speed request value is transmitted from the TCM to the ECM. The transmitted engine speed request value is at least equal to the on-coming gear speed.

The above features and advantages and other features and advantages of the present invention are readily apparent from the following detailed description of the best modes for carrying out the invention when taken in connection with the accompanying drawings.

DETAILED DESCRIPTION

Figure 1:
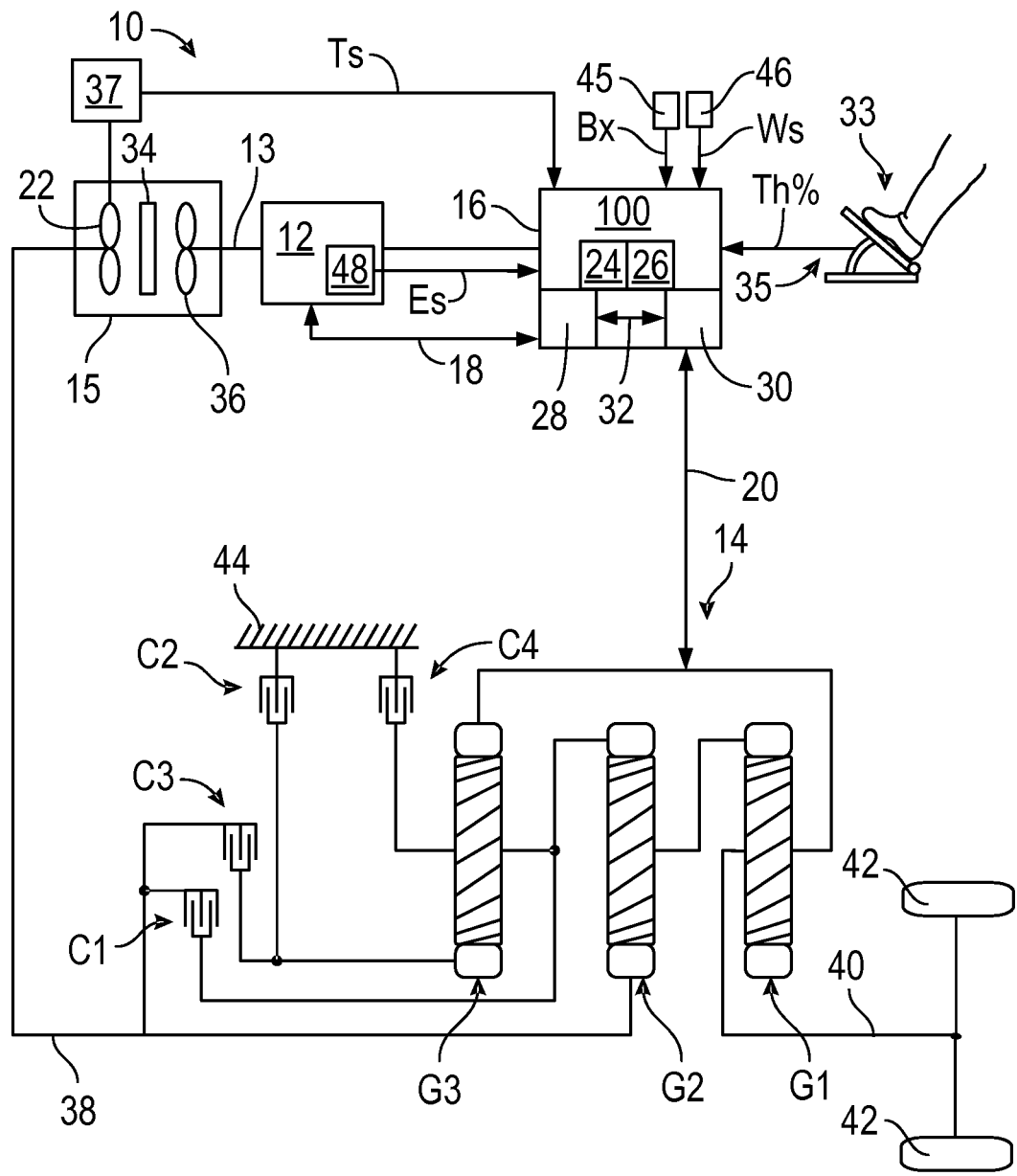
FIG. 1 is a schematic illustration of an example vehicle having an engine, a transmission, a torque converter, and a controller programmed to control a powerdown low throttle (PDLT) downshift of the transmission as set forth herein.

Referring to the drawings, wherein like reference numbers correspond to like or similar components throughout the several figures, FIG. 1 is a schematic illustration of a vehicle 10 having an engine 12, a transmission 14, a torque converter 15, and a controller 16. The vehicle 10 may be any passenger or commercial automobile such as, for example, a hybrid electric vehicle including a plug-in hybrid electric vehicle, an extended range electric vehicle, or other vehicles. The vehicle 10 may take many different forms and include multiple and/or alternate components and facilities. While an example vehicle 10 is shown in the Figures, the components illustrated in the Figures are not intended to be limiting. Indeed, additional or alternative components and/or implementations may be used.

The controller 16 is in communication with the engine 12 and transmission 14 via a set of control and feedback signals (arrows 18 and 20, respectively). The controller 16 is configured, via the necessary hardware and associated software programming embodied as the control logic or method 100 of FIG. 3, to provide a method of controlling a rotational speed of the engine 12, relative to a rotational speed of a turbine 22 of the torque converter 15 during a powerdown low-throttle (PDLT) downshift. As explained in more detail below, by increasing the rotational speed of the engine 12 to be at a level near or above the rotational speed of the turbine 22, the rotational speed of the transmission turbine 22 will be prevented from crossing an engine speed lash zone so as to prevent clunk and/or other noises from occurring.

The controller 16 may be configured as a microprocessor-based computing device having such common elements as the processor 24 and memory 26, the latter including tangible, non-transitory memory devices or media such as read only memory (ROM), random access memory (RAM), optical memory, flash memory, electrically-programmable read-only memory (EPROM), and the like. The controller 16 may also include any required logic circuitry including, but not limited to, proportional-integral-derivative (PID) control logic, a high-speed clock, analog-to-digital (A/D) circuitry, digital-to-analog (D/A) circuitry, a digital signal processor or DSP, and the necessary input/output (I/O) devices and other signal conditioning and/or buffer circuitry.

The controller 16 may include an engine control module 28 (ECM) and a transmission control module 30 (TCM) that are in operative communication with one another over a controller area network (CAN) bus 32 as shown. In the non-limiting example of FIG. 1, controller 16 is programmed to execute the method 100.

Figure 2:
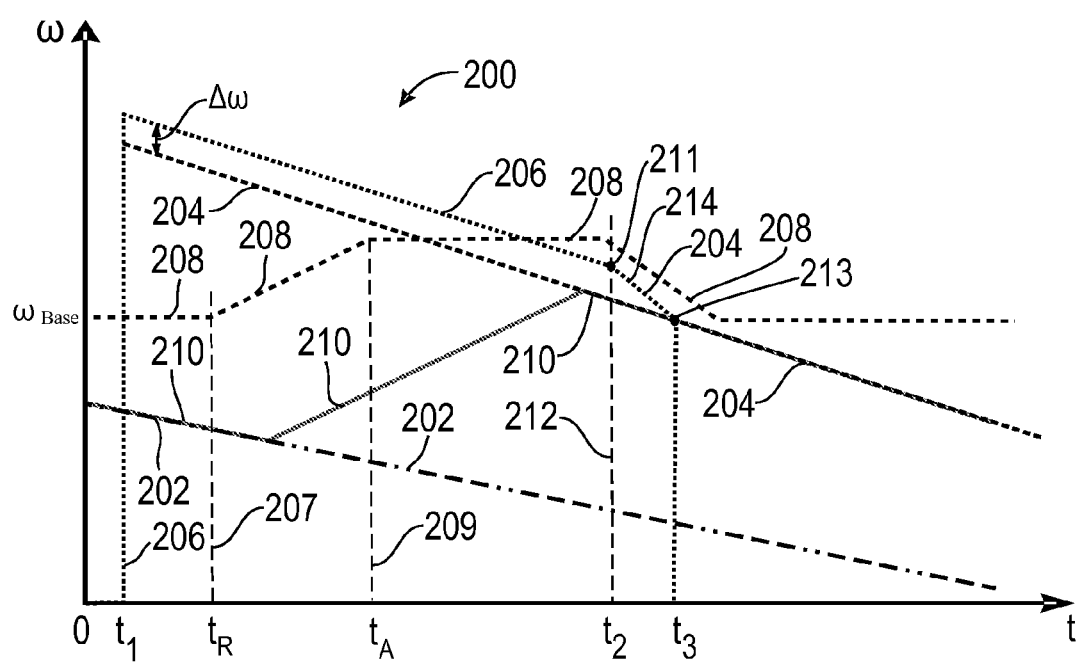
FIG. 2 is an example time plot of various componentry of the engine, transmission, and torque converter, used by the controller of FIG. 1, in controlling a PDLT downshift.

Referring to FIGS. 1 and 2, the ECM 28 receiving an engine speed request value 206 from the TCM 30 across the CAN bus 32. In turn, the ECM 28 transmits a control signal to the engine 12 (arrow 18) so that the engine 12 produces an engine torque. The engine 12 includes a crankshaft 13 that rotates at an engine speed. The engine 12 may include any device configured to generate the engine torque by, for example, converting fuel into rotational motion. Accordingly, the engine 12 may be an internal combustion engine configured to convert energy from a fossil fuel into rotational motion using a thermodynamic cycle.

The engine 12 is responsive to a torque request, in the form of a control signal (arrow 18), received from the ECM 28, requesting a desired level of engine torque. Referring to FIG. 1, the torque request may be in response to an input from an accelerator pedal 33, or another suitable throttle input device, to the controller 16. The torque input request may be in the form of an applied force to or a corresponding percentage of travel 35 of the accelerator pedal 33 that is detected via a force or throttle position sensor. Travel 35 of the accelerator pedal 33 may vary from between no travel, i.e., 0% travel 35, and full travel, i.e., 100% travel. As is know to those of skill in the relevant art, the travel 35 of the accelerator pedal 33 corresponds to a throttle position, i.e., torque request, of the engine 12. As such, when no force is applied to the accelerator pedal 33, no throttle, i.e., no torque, is requested of the engine 12.

With continued reference to FIG. 1, the torque converter 15 is operatively connected to the engine 12 and transmission 14. As is known to those skilled in the art, the torque converter 15 includes the turbine 22 that spins at a turbine speed, due to the motion of transmission fluid. The torque converter 15 may also include other components not shown, such as a stator 34 and an impeller 36. A speed sensor 37 may be operatively connected to the turbine 22. The speed sensor 37 is configured to measure the speed of the turbine 22 and transmits the speed of the turbine 22 to the controller 16.

Still referring to FIG. 1, the transmission 14 includes a plurality of gear sets, for instance three gear sets G1, G2, G3, that are configured to selectively engage a set of friction clutches, for instance four clutches C1, C2, C3, C4, in different combinations to establish multiple forward gear ratios and a reverse gear ratio between an input member 38 and an output member 40 of the transmission 14. As such, the gear sets G1, G2, G3 may be movable between a plurality of gear ratios, such as a first gear ratio, a second gear ratio, a third gear ratio, and the like. It should be appreciated that more or fewer clutches may be included, as understood by those skilled in the art. The input member 38 receives input torque from the engine 12, and the output member 40 provides the output torque through a final drive to a set of vehicle wheels 42, as is understood by those skilled in the art.

The friction clutches C1-C4 are applied via fluid (not shown) that is circulated under pressure from a fluid pump (not shown) and flow control valves (not shown) so as to connect nodes/members of the various gear sets G1, G2, G3 to one another or to a stationary member 44 of the transmission 14. As is known in the art, the term "nodes" may encompass sun, ring, and carrier gear elements in a typical planetary gear configuration. The transmission 14 of FIG. 1 may be a multi-speed transmission 14, for instance an 8-speed transmission, although the transmission 14 is not limited to such an embodiment.

Shifting between gear ratios involves, in most cases, disengaging a clutch (known as an off-going clutch) associated with the initial gear ratio and engaging another clutch (known as an on-coming clutch) associated with the desired gear ratio. A downshift refers to a shift operation from a higher gear ratio, e.g., a third gear ratio, to a lower gear ratio, e.g., a first gear ratio. Sub-idle refers to when a rotational speed of the engine is greater than a rotational speed of the turbine 22. A PDLT downshift refers to a shift operation when the vehicle 10 is decelerating, at sub-ide, and no additional power or input torque is being requested.

Figure 3:
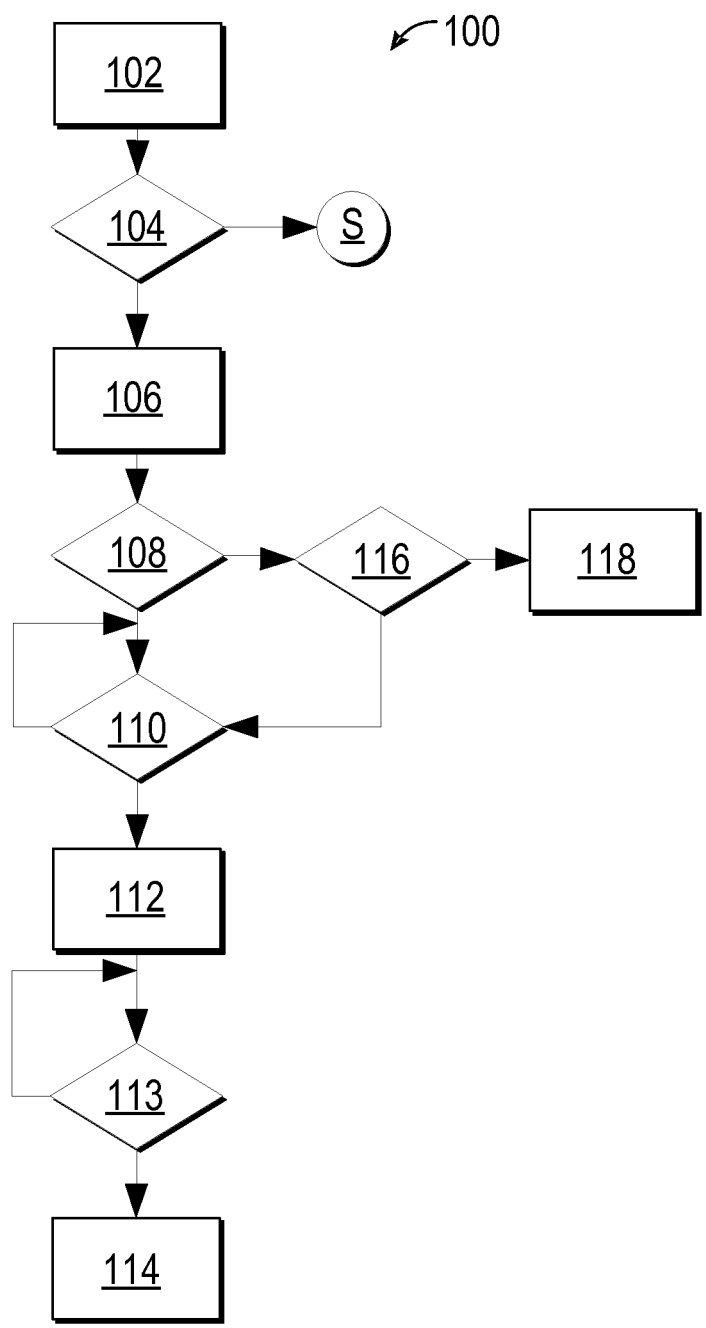
FIG. 3 is a flow chart describing example control logic for controlling a PDLT downshift.

The controller 16 of FIG. 1 selectively executes the method 100, an example of which is shown in FIG. 3, during a sub-idle coasting downshift of the vehicle 10. Inputs to the controller 16 may include, but should not be limited to, a throttle level (arrow Th %) from the accelerator pedal 33; a braking level (arrow $B_X$) from a pedal sensor 45; a wheel speed (arrow $W_S$) from a wheel speed sensor 46; a turbine speed 210 (arrow $T_S$) of the torque converter 15 from the speed sensor 37; an engine speed 208 (arrow $E_S$) from an engine 12 speed sensor 48; and the like.

Referring now to FIG. 2, a time plot 200 of shift componentry speeds of the engine 12, transmission 14 components, and the turbine 22, in accordance with the method 100, are illustrated. The vertical axis represents a rotational speed of the componentry, indicated by "ω", and the horizontal axis represents time, indicated by the letter "t".

During vehicle 10 operation, the transmission 14 may require a downshift from a higher gear ratio, e.g., a third gear, to a lower gear ratio, e.g., a first gear, as dictated by internal transmission hardware inertias. Such a downshift may be required when the vehicle 10 is decelerating, at zero-throttle, i.e., the throttle level (arrow Th %) is at 0%, and the vehicle 10 is at a low speed and an actual engine speed 208 is higher than the transmission turbine speed 210, i.e., at sub-idle. As such, a sub-idle downshift control methodology of the method 100 will use off-going, power-down type of controls to perform the downshift.

The shift componentry speeds may be in revolutions per minute (RPM) and include an off-going turbine speed 202, corresponding to the off-going gear ratio; an on-coming turbine speed 204, corresponding to the on-coming gear ratio; an actual engine speed 208; an actual turbine speed 210; and a commanded engine speed offset speed $\Delta\omega$.

The method 100, an example of which will now be described with reference to FIG. 3, controls the sub-idle downshift. With respect to the operation of the controller in execution of the control logic 100, the method may begin at step 102.

At step 102, the TCM 30 of the controller 16 transmits a feedback signal (arrow 20) to the transmission 14 to request a downshift from an off-going gear ratio to an on-coming gear ratio. The turbine 22 is rotating at the off-going turbine speed 202 when the transmission is in the off-going gear ratio and the turbine 22 is configured to rotate at an on-coming turbine speed 204 when the transmission is in the on-coming gear ratio. The on-coming turbine speed 204 is greater than the off-going turbine speed 202. The turbine speed 210 increases, over time t, between the off-going turbine speed 202 and the on-coming turbine speed 204. Referring to FIG. 2, the off-going gear ratio 202 may be a third gear ratio and the on-coming turbine speed 204 may be a first gear ratio. Alternatively, the off-going gear ratio 202 may be a second gear ratio and the on-coming turbine speed 204 may be a first gear ratio. Next the method proceeds to step 104.

At step 104, a determination is made by the controller 16 whether the requested downshift is a PDLT shift. As previously described, a PDLT shift occurs when the vehicle 10 is determined to be decelerating within a powerdown deceleration range, the actual vehicle speed is determined to be is less than a threshold vehicle speed, and/or a requested output torque requested of the engine 12 is less than a threshold output torque. In one embodiment, the threshold output torque requested is zero, such that no output torque of the engine is requested. Further, when a PDLT shift is requested, the vehicle 10 is determined to be at sub-idle, meaning the actual engine speed 208 is higher than the turbine speed 210. If the determination is made at step 104 that the requested downshift is not a PDLT shift, the method ends at S. However, if the determination is made that the requested downshift is a PDLT shift, the method proceeds to step 106.

Still referring to FIG. 3, at step 106, the controller 16 initiates an engine speed request value 206 such that an engine speed request value 206 is transmitted from the TCM 30 to the ECM 28 over the CAN bus 32 at a first time $t_1$ in FIG. 2. At the first time $t_1$, the transmitted engine speed request value 206 is at least equal to the on-coming turbine speed 204 (as indicated at $\omega_1$). As illustrated in FIG. 2, the transmitted engine speed request value 206, between $t_1$ and a second time $t_2$, is equal to the on-coming gear speed plus an offset speed, where the offset speed is indicated as $\Delta\omega$ in FIG. 2. The purpose of the transmitted engine speed request value 206 is to keep the actual engine speed 208 at or above the on-coming turbine speed 204. As such, the engine speed request value 206 ensures that the actual engine speed 208 remains higher than the turbine speed 210 during the entire shift (between the first time $t_1$ and the second time $t_2$) and the shift will be completed with off-going controls and any "clunk" or "output bump" will be prevented. The terms "clunk" and "output" bump are known by those skilled in the art as describing perceived sound and/or feel of any undesirable engine output torque oscillations.

The engine speed request value 206 is transmitted to the controller 16 at the first time $t_1$, which is at or near the time the PDLT shift is requested, so that the actual engine speed 208 has sufficient time to react to the engine speed request value 206. As is illustrated in FIG. 2, while the engine speed request value 206 is transmitted at the first time $t_1$, the actual engine speed 208 initially remains at a base engine speed $\omega_{Base}$ and the actual engine speed 208 does not begin to increase until a reaction time $t_R$ is reached, as indicated at 207. The actual engine speed 208 continues to react to the engine speed request value 206 such that the actual engine speed 208 continues to increase, over time t, until an achievement time to is reached, as indicated at 209, where the actual engine speed 208 has achieved an offset speed $\omega_{offset}$.

Once the engine speed request value 206 is transmitted at step 106, the method proceeds to step 108, as shown in FIG. 3. At step 108, a determination is made by the controller 16 as to whether the ECM 28 is responding to the engine speed request value 206. If the determination is made that the ECM 28 is responding to the engine speed request value 206, the method proceeds to step 110.

Referring again to FIG. 3, at step 110, a determination is made by the controller 16 as to whether the on-coming turbine speed 204 has been achieved at the second time $t_2$ such that the downshift is completed. Therefore, in this instance, the transmission 14 has shifted from the off-going gear ratio to the on-coming gear ratio, where the on-coming turbine speed 204 has a higher rotational speed than that of the off-going turbine speed 202, as illustrated in FIG. 2. If the determination is made that the on-coming gear ratio has not been achieved, step 110 repeats. However, if the determination is made that the on-coming gear ratio has been achieved at the second time $t_2$ such that the downshift is completed, as indicated at 212 in FIG. 2, the method proceeds to step 112. Referring again to FIG. 3, the method next proceeds to step 112.

With continued reference to FIG. 3, at step 112, once the on-coming gear ratio has been achieved, the requested engine speed 206 is adjusted at the second time $t_2$ by adjusting the engine speed request value 206 to apply a ramp rate 214. More specifically, referring to FIG. 2, the ramp rate 214 is applied between the second time $t_2$ (indicated at 211) and a third time $t_3$ (indicated at 211), so that the engine speed request value 206 is ramped down, i.e., the engine speed request value 206 is not maintained at a constant offset from the rotational speed of the on-coming turbine speed 204, until the engine speed request value 206 equals the base engine speed $\omega_{Base}$. Referring again to FIG. 3, the method proceeds to step 113.

At step 113, a determination is made as to whether the engine speed equals the base engine speed $\omega_{Base}$. If the determination is made that the actual engine speed 208 does not equal the base engine speed $\omega_{Base}$, step 113 repeats. However, if the determination is made that the actual engine speed 208 does equal the base engine speed $\omega_{Base}$, the method proceeds to step 114.

With continued reference to FIG. 3, at step 114, when the engine speed request value 206 equals the base engine speed $\omega_{Base}$ (shown at 213) in FIG. 2, the engine speed request value 206 is terminated.

Still referring to FIG. 3 and referring again to step 108, if the determination is made that the ECM 28 is not responding to the engine speed request value 206, the method proceeds to step 116. At step 116, the controller 16 determines whether the turbine speed 210 is greater than the actual engine speed 208. If the determination is made that the turbine speed 210 is greater than the actual engine speed 208, the method proceeds to step 118.

At step 118, the controller 16 initiates a downshift of the transmission 14 using coast down controls, instead of the powerdown low-throttle controls described above. Following step 118, the method 100 ends.

However, referring again to step 116 of FIG. 3, if a determination is made that the turbine speed has not risen above the engine speed, the method proceeds to step 110 to determine the time t when the on-coming gear ratio has been achieved.

While the best modes for carrying out the disclosure have been described in detail, those familiar with the art to which this disclosure relates will recognize various alternative designs and embodiments for practicing the disclosure within the scope of the appended claims.

The invention claimed is:

1. A method of controlling a vehicle having a transmission, a torque converter having a turbine, a transmission control module (TCM), an engine, and an engine control module (ECM), the method comprising:
   requesting a downshift of the transmission from an off-going gear ratio to an on-coming gear ratio, with the TCM;
   wherein the turbine is rotating at an off-going turbine speed at the off-going gear ratio and the turbine is configured to rotate at an on-coming turbine speed at the on-coming gear ratio, wherein the on-coming turbine speed is greater than the off-going turbine speed;
   determining the requested downshift is a powerdown low-throttle (PDLT) shift, with the TCM;
   wherein the PDLT shift is defined as a change in gear ratios of the transmission that occurs when the vehicle is decelerating with a rotational speed of the engine being greater than a rotational speed of the turbine without an additional torque being requested from the engine;
   transmitting an engine speed request value from the TCM to the ECM when the requested downshift is a PDLT shift;
   wherein the transmitted engine speed request value is at least equal to the on-coming turbine speed;
   increasing an actual engine speed of the engine with the ECM; and
   controlling at least one clutch of the transmission, with the TCM, to execute the requested downshift.

2. The method, as set forth in claim 1, wherein the transmitted engine speed request value is equal to the on-coming turbine speed plus an offset speed.

3. The method, as set forth in claim 2, further comprising:
   determining the downshift is completed such that the on-coming gear ratio has been achieved;
   adjusting the engine speed request value with a ramp rate once the on-coming gear ratio has been achieved, to define a ramped engine speed request value;
   determining a base engine speed has been achieved; and
   terminating the engine speed request value when the ramped engine speed request value is at the base engine speed.

4. The method, as set forth in claim 3, wherein transmitting the engine speed request value from the TCM to the ECM is further defined as transmitting the engine speed request value from the TCM to the ECM when the engine speed is higher than the turbine speed; and
   wherein adjusting the engine speed request value with the ramp rate is further defined as adjusting the engine speed request value with the ramp rate once the on-coming gear ratio has been achieved and the turbine speed is higher than the engine speed.

5. The method, as set forth in claim 1, wherein determining the requested downshift is a PDLT shift is further defined as:
   determining the vehicle is decelerating within a powerdown deceleration range;
   determining the vehicle speed is less than a threshold vehicle speed; and
   determining an output torque requested of the engine is less than a threshold output torque.

6. The method, as set forth in claim 5, wherein determining an output torque requested of the engine is further defined as determining that an output torque requested of the engine is zero.

7. The method, as set forth in claim 1, wherein the off-going gear ratio is a third gear ratio and the on-coming gear ratio is a first gear ratio.

8. The method, as set forth in claim 1, wherein the off-going gear ratio is a second gear ratio and the on-coming gear ratio is a first gear ratio.

* * * * *